July 23, 1957  W. E. BEGALKA  2,800,071
OUTDOOR GRILL
Filed Nov. 29, 1954  2 Sheets-Sheet 1
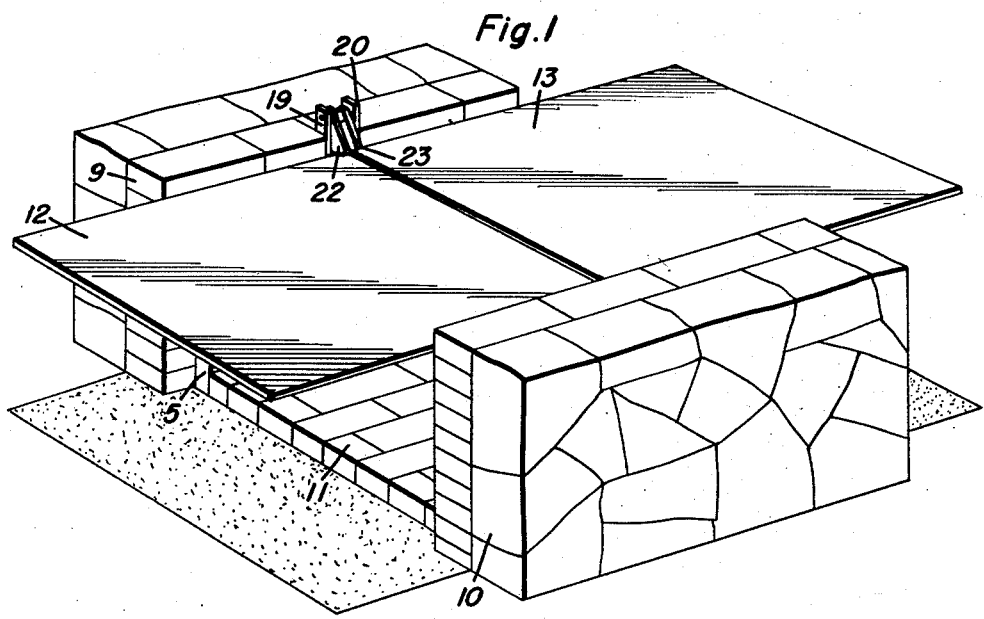
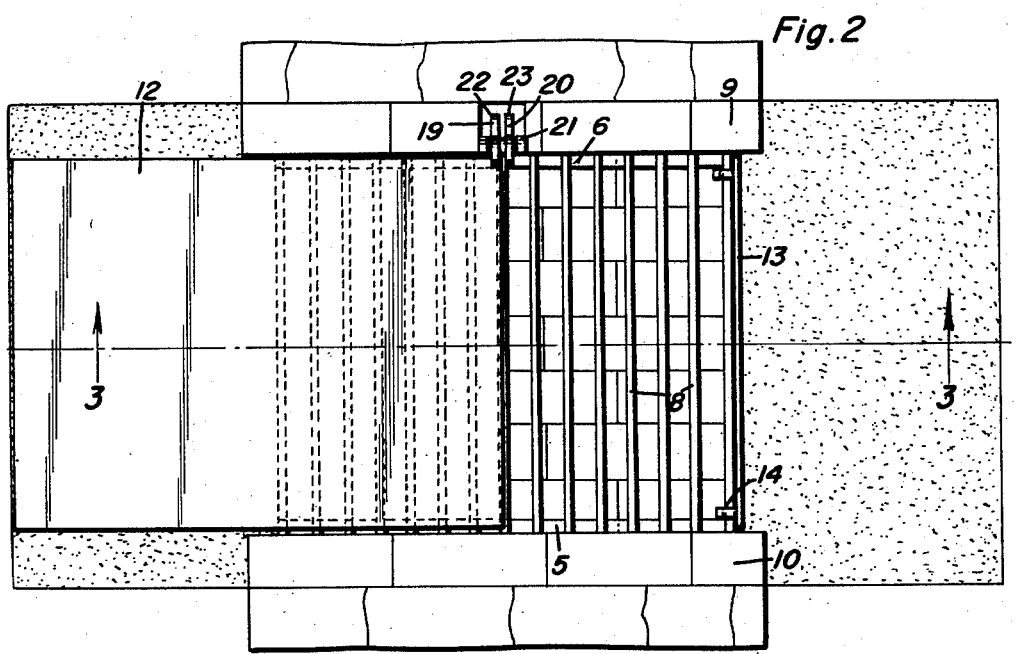
Walter E. Begalka
INVENTOR.

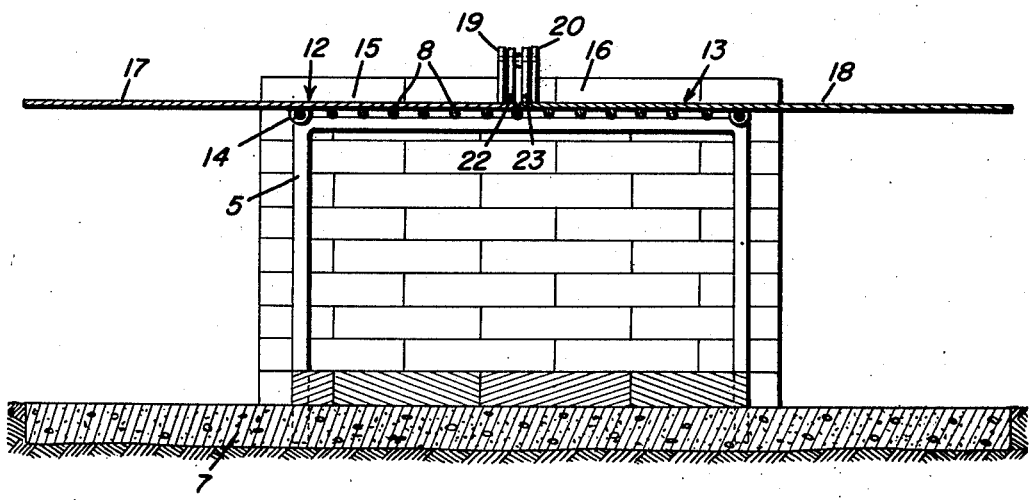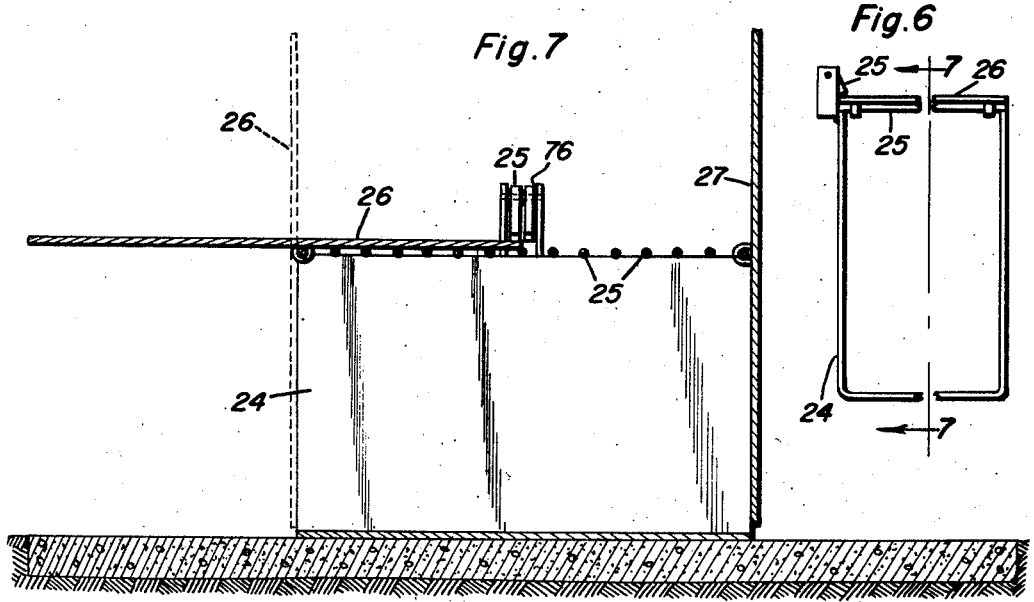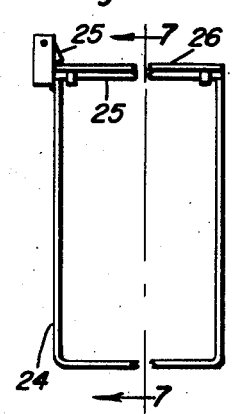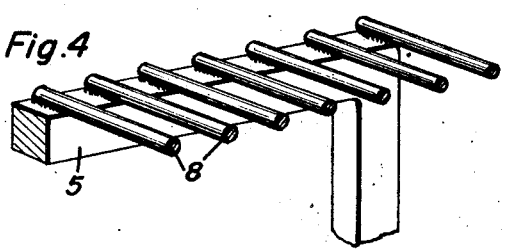

United States Patent Office 2,800,071
Patented July 23, 1957

2,800,071

OUTDOOR GRILL

Walter E. Begalka, Clear Lake, S. Dak.

Application November 29, 1954, Serial No. 471,718

1 Claim. (Cl. 99—339)

The present invention relates to new and useful improvements in outdoor grills for barbecuing or otherwise cooking food.

An important object of the invention is to provide an open grill composed of spaced apart parallel rods supported in an elevated position and on top of which solid sheet metal grill plates are swingably mounted for movement into or out of covering position on the open grill for selectively using either the open grill or the grill plates for cooking purposes.

Another object is to counterbalance the grill plates for maintaining the same in an upright open position and providing automatic latch means securing the grill plates in a lower cooking position.

A further object is to provide a device of this character of simple and practical construction, which is efficient and reliable in operation, neat and attractive in appearance, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a top plan view;

Figure 3 is a vertical sectional view taken on a line 3—3 of Figure 2 and showing the grill plates lowered;

Figure 4 is an enlarged fragmentary perspective view of the open grill;

Figure 5 is an enlarged perspective view of one of the latches for the grill plates;

Figure 6 is an end elevational view of a portable grill, shown on a reduced scale, and Figure 7 is an enlarged vertical sectional view taken on a line 7—7 of Figure 6.

Referring now to the drawings in detail, wherein for the purpose of illustration I have disclosed a preferred embodiment of my invention, the numerals 5 and 6 designate a pair of inverted U-shaped frame members having their lower end portions embedded in a foundation 7 or otherwise suitably anchored to maintain the frame members in an upright position in spaced apart parallel relation to each other. A plurality of rods 8 are welded or otherwise suitably secured in spaced parallel relation to each other in a transverse bridging position on top of the frame members to form an open grill.

Masonry walls 9 and 10 preferably of firebrick construction are erected outwardly at the sides of the frame members to close two sides of the grill, while the remaining sides are left open and similar bricks 11 may be laid under the grill between the walls.

A pair of sheet metal grill plates 12 and 13 are provided with bearing eyes 14 at their under sides and slightly toward one end of the plates and in which the endmost rods 8 are received for pivotally connecting the plates at the open sides of the grill foundation for vertical swinging movement thereof and with the shorter ends 15 and 16 of the plates positioned inwardly to overlie the rods and with the longer ends 17 and 18 of the plates projecting outwardly at the open sides of the grill foundation to counterbalance the plates and to swing and maintain the plates vertically, as shown by full lines at the right hand side of Figure 7. A pair of latches 19 and 20 of substantially L-shape are pivoted at their upper ends on a pin 21 supported transversely in a pair of upstanding brackets 22 and 23 which are welded or otherwise suitably secured to the central portion of one of the frame members 5 or 6 and with the lower portion of the latches swingable into and out of overlying position at one side of and adjacent the meeting inner edges of the shorter end portions 15 and 16 of the plates to lock the plates in a closed horizontal position on top of the open grill.

By swinging either of the latches to release a related plate, the counterbalanced outer end of the latter will swing the plate into a vertical position to uncover the open grill to use the latter for cooking purposes.

The grill plates 12 and 13 may also be used for cooking purposes by swinging the same into a horizontal position and locked by the latches 19 and 20 and the outwardly projecting ends of the plates provide shelves on which the cooked food may be kept warm or for other purposes.

Figures 6 and 7 illustrate a modified construction which comprises a portable grill composed of a sheet metal frame 24 of U-shape in cross section for resting on the ground and having a plurality of rods 25 suitably secured in a transverse position to the upper edges of the frame and in spaced apart parallel relation to each other to form an open grill. The sheet metal grill plates 26 and 27 are pivoted to the endmost rods in a counterbalanced position for vertical swinging movement in the same manner heretofore described, and the plates are locked in a closed position on top of the open grill by pivoted latches 25 and 26.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An outdoor grill comprising a foundation structure, a pair of substantially rectangular frames of inverted U-shape rising from said foundation structure in laterally spaced parallel relation, cross connecting laterally spaced grill rods fixed on top of said frames, a pair of side walls rising from said foundation structure alongside and outwardly of said frames parallel therewith and forming together with said foundation structure, frames and rods, a rectangular open top grill having two closed sides and two open sides with a pair of remote grill rods at said open sides, a pair of rectangular cover plates for said rods hinged intermediate opposite ends thereof on said remote rods for vertical swinging into horizontal end to end covering relation to said rods to form a heating surface thereon and warming ledges outwardly of said open sides of the grill, said plates being overbalanced to swing into vertical closing relation to said open sides to expose said rods for grilling operations thereon with the open sides of the grill closed, and latch means on one of said frames for holding said plates in covering relation to said rods.

References Cited in the file of this patent

UNITED STATES PATENTS

| | | |
|---|---|---|
| 402,936 | Jolly | May 7, 1889 |
| 812,728 | Deppe | Feb. 13, 1906 |
| 1,721,308 | Lormor | July 16, 1929 |
| 1,802,812 | Gratz | Apr. 28, 1931 |
| 2,021,915 | Hancock et al. | Nov. 26, 1935 |
| 2,033,898 | Krebs | Mar. 10, 1936 |
| 2,212,015 | Dugan | Aug. 20, 1940 |
| 2,246,440 | Hester | June 17, 1941 |
| 2,403,134 | Stephenson | July 2, 1946 |
| 2,512,223 | Contiguglia | June 20, 1950 |